US008122034B2

(12) United States Patent
Aravamudan et al.

(10) Patent No.: US 8,122,034 B2
(45) Date of Patent: Feb. 21, 2012

(54) METHOD AND SYSTEM FOR INCREMENTAL SEARCH WITH REDUCED TEXT ENTRY WHERE THE RELEVANCE OF RESULTS IS A DYNAMICALLY COMPUTED FUNCTION OF USER INPUT SEARCH STRING CHARACTER COUNT

(75) Inventors: Murali Aravamudan, Windham, NH (US); Rakesh D. Barve, Bangalore (IN); Sashikumar Venkataraman, Bangalore (IN); Ajit Rajasekharan, West Windsor, NJ (US)

(73) Assignee: Veveo, Inc., Andover, MA (US)

( * ) Notice: Subject to any disclaimer, the term of this patent is extended or adjusted under 35 U.S.C. 154(b) by 394 days.

(21) Appl. No.: 11/246,432

(22) Filed: Oct. 7, 2005

(65) Prior Publication Data
US 2007/0005563 A1    Jan. 4, 2007

Related U.S. Application Data

(60) Provisional application No. 60/695,463, filed on Jun. 30, 2005.

(51) Int. Cl.
*G06F 7/00* (2006.01)
*G06F 13/00* (2006.01)
*G06F 3/048* (2006.01)

(52) U.S. Cl. ........ 707/752; 707/706; 707/748; 715/816; 725/39

(58) Field of Classification Search .................. 707/1, 3, 707/5, 6, 7, 706, 748, 752; 709/230, 231; 715/816; 725/39
See application file for complete search history.

(56) References Cited

U.S. PATENT DOCUMENTS
1,261,167 A    4/1918   Russell
(Continued)

FOREIGN PATENT DOCUMENTS
EP    1143691    10/2001
(Continued)

OTHER PUBLICATIONS

Press Release From Tegic Communications, Tegic Communications Is Awarded Patent for Japanese T9(R) Text Input Software From the Japan Patent Office, Oct. 12, 2004. Retrieved Nov. 18, 2005 From HTTP://WWW.TEGIC.COM/PRESS_VIEW.HTML?RELEASE_NUM=55254242.

(Continued)

*Primary Examiner* — Vincent Boccio
*Assistant Examiner* — Huen Wong
(74) *Attorney, Agent, or Firm* — Wilmer Cutler Pickering Hale & Dorr LLP.

(57) ABSTRACT

A method and system are provided for processing a search request received from a user operating a text input device. The search request is directed at identifying a desired item from a set of items. Each of the items of the set of items has one or more associated terms. The method includes receiving a query input from a user directed at identifying the desired item. The query input comprises one or more characters input by the user on the text input device. As each character of the query input is received from the user, a group of items having one or more terms matching the characters received thus far of the query input is dynamically identified. The items in this group of items are ordered based on relevance values of the terms matching the characters and on the number of characters of the query input used in identifying the group of items. Identification of the group of items as ordered is transmitted to the user to be displayed on a device operated by the user.

30 Claims, 10 Drawing Sheets

U.S. PATENT DOCUMENTS

| | | | |
|---|---|---|---|
| 4,760,528 | A | 7/1988 | Levin |
| 4,893,238 | A | 1/1990 | Venema |
| 5,224,060 | A | 6/1993 | Ma et al. |
| 5,337,347 | A | 8/1994 | Halstead-Nussloch et al. |
| 5,369,605 | A | 11/1994 | Parks |
| 5,487,616 | A | 1/1996 | Ichbiah |
| 5,623,406 | A | 4/1997 | Ichbiah |
| 5,635,989 | A | 6/1997 | Rothmuller |
| 5,805,155 | A | 9/1998 | Allibhoy et al. |
| 5,818,437 | A | 10/1998 | Grover et al. |
| 5,828,420 | A | 10/1998 | Marshall et al. |
| 5,828,991 | A | 10/1998 | Skiena et al. |
| 5,859,662 | A | 1/1999 | Cragun et al. |
| 5,880,768 | A | 3/1999 | Lemmons et al. |
| 5,912,664 | A | 6/1999 | Eick et al. |
| 5,937,422 | A | 8/1999 | Nelson et al. |
| 5,945,928 | A | 8/1999 | Kushler et al. |
| 5,953,541 | A | 9/1999 | King et al. |
| 6,005,565 | A | 12/1999 | Legall et al. |
| 6,005,597 | A | 12/1999 | Barrett et al. |
| 6,006,225 | A * | 12/1999 | Bowman et al. .................. 707/5 |
| 6,011,554 | A | 1/2000 | King et al. |
| 6,075,526 | A | 6/2000 | Rothmuller |
| 6,133,909 | A | 10/2000 | Schein et al. |
| 6,184,877 | B1 | 2/2001 | Dodson et al. |
| 6,189,002 | B1 | 2/2001 | Roitblat |
| 6,260,050 | B1 | 7/2001 | Yost et al. |
| 6,266,048 | B1 | 7/2001 | Carau, Sr. |
| 6,266,814 | B1 | 7/2001 | Lemmons et al. |
| 6,269,361 | B1 | 7/2001 | Davis et al. |
| 6,286,064 | B1 | 9/2001 | King et al. |
| 6,307,548 | B1 | 10/2001 | Flinchem et al. |
| 6,307,549 | B1 | 10/2001 | King et al. |
| 6,438,579 | B1 * | 8/2002 | Hosken .......................... 709/203 |
| 6,466,933 | B1 | 10/2002 | Huang et al. |
| 6,480,837 | B1 * | 11/2002 | Dutta ............................... 707/3 |
| 6,529,903 | B2 | 3/2003 | Smith |
| 6,564,213 | B1 * | 5/2003 | Ortega et al. ..................... 707/5 |
| 6,594,657 | B1 | 7/2003 | Livowsky et al. |
| 6,600,496 | B1 | 7/2003 | Wagner et al. |
| 6,614,455 | B1 | 9/2003 | Cuijpers et al. |
| 6,615,248 | B1 | 9/2003 | Smith |
| 6,711,585 | B1 * | 3/2004 | Copperman et al. ........ 707/104.1 |
| 6,721,954 | B1 | 4/2004 | Nickum |
| 6,732,369 | B1 | 5/2004 | Schein et al. |
| 6,757,906 | B1 | 6/2004 | Look et al. |
| 6,772,147 | B2 | 8/2004 | Wang |
| 6,785,671 | B1 | 8/2004 | Bailey et al. |
| 6,839,702 | B1 | 1/2005 | Patel et al. |
| 6,839,705 | B1 | 1/2005 | Grooters |
| 6,845,374 | B1 * | 1/2005 | Oliver et al. ...................... 707/5 |
| 6,850,693 | B2 | 2/2005 | Young et al. |
| 6,865,575 | B1 | 3/2005 | Smith et al. |
| 6,907,273 | B1 | 6/2005 | Smethers |
| 6,965,374 | B2 | 11/2005 | Villet et al. |
| 7,013,304 | B1 | 3/2006 | Schuetze et al. |
| 7,136,854 | B2 | 11/2006 | Smith |
| 7,225,180 | B2 | 5/2007 | Donaldson et al. |
| 7,225,184 | B2 | 5/2007 | Carrasco et al. |
| 7,225,455 | B2 | 5/2007 | Bennington et al. |
| 7,266,551 | B2 * | 9/2007 | Kravets ............................ 707/4 |
| 7,293,231 | B1 | 11/2007 | Gunn et al. |
| 7,424,510 | B2 * | 9/2008 | Gross et al. .................. 709/203 |
| 2002/0042791 | A1 | 4/2002 | Smith et al. |
| 2002/0083448 | A1 | 6/2002 | Johnson |
| 2002/0133481 | A1 | 9/2002 | Smith et al. |
| 2002/0199194 | A1 * | 12/2002 | Ali ................................. 725/46 |
| 2003/0011573 | A1 | 1/2003 | Villet et al. |
| 2003/0014753 | A1 | 1/2003 | Beach et al. |
| 2003/0023976 | A1 | 1/2003 | Kamen et al. |
| 2003/0046698 | A1 | 3/2003 | Kamen et al. |
| 2003/0066079 | A1 | 4/2003 | Suga |
| 2003/0237096 | A1 | 12/2003 | Barrett et al. |
| 2004/0021691 | A1 * | 2/2004 | Dostie et al. .................. 345/773 |
| 2004/0046744 | A1 | 3/2004 | Rafii et al. |
| 2004/0049783 | A1 | 3/2004 | Lemmons et al. |
| 2004/0073926 | A1 | 4/2004 | Nakamura et al. |
| 2004/0078815 | A1 | 4/2004 | Lemmons et al. |
| 2004/0078816 | A1 | 4/2004 | Johnson |
| 2004/0078820 | A1 | 4/2004 | Nickum |
| 2004/0093616 | A1 | 5/2004 | Johnson |
| 2004/0111745 | A1 | 6/2004 | Schein et al. |
| 2004/0128686 | A1 | 7/2004 | Boyer et al. |
| 2004/0194141 | A1 | 9/2004 | Sanders |
| 2004/0216160 | A1 | 10/2004 | Lemmons et al. |
| 2004/0261021 | A1 | 12/2004 | Mittal et al. |
| 2005/0015366 | A1 | 1/2005 | Carrasco et al. |
| 2005/0071874 | A1 | 3/2005 | Elcock et al. |
| 2005/0086234 | A1 * | 4/2005 | Tosey ........................... 707/100 |
| 2005/0086691 | A1 | 4/2005 | Dudkiewicz et al. |
| 2005/0086692 | A1 | 4/2005 | Dudkiewicz et al. |
| 2005/0120004 | A1 * | 6/2005 | Stata et al. ....................... 707/3 |
| 2005/0192944 | A1 | 9/2005 | Flinchem |
| 2005/0210020 | A1 | 9/2005 | Gunn et al. |
| 2005/0210402 | A1 | 9/2005 | Gunn et al. |
| 2005/0223308 | A1 | 10/2005 | Gunn et al. |
| 2005/0240580 | A1 | 10/2005 | Zamir et al. |
| 2005/0256846 | A1 * | 11/2005 | Zigmond et al. .................. 707/3 |
| 2005/0267994 | A1 * | 12/2005 | Wong et al. .................. 709/246 |
| 2005/0283468 | A1 * | 12/2005 | Kamvar et al. ................... 707/3 |
| 2006/0059044 | A1 | 3/2006 | Chan et al. |
| 2006/0075429 | A1 | 4/2006 | Istvan et al. |
| 2006/0101499 | A1 | 5/2006 | Aravamudan et al. |
| 2006/0101503 | A1 | 5/2006 | Venkataraman |
| 2006/0101504 | A1 | 5/2006 | Aravamudan et al. |
| 2006/0112162 | A1 | 5/2006 | Marot et al. |
| 2006/0163337 | A1 | 7/2006 | Unruh |
| 2006/0167676 | A1 | 7/2006 | Plumb |
| 2006/0167859 | A1 | 7/2006 | Verbeck Sibley et al. |
| 2006/0256078 | A1 | 11/2006 | Flinchem et al. |
| 2006/0274051 | A1 | 12/2006 | Longe et al. |
| 2007/0005563 | A1 | 1/2007 | Aravamudan |
| 2007/0027852 | A1 | 2/2007 | Howard et al. |
| 2007/0050337 | A1 | 3/2007 | Venkataraman et al. |
| 2007/0061321 | A1 | 3/2007 | Venkataraman |
| 2007/0061754 | A1 | 3/2007 | Ardhanari et al. |
| 2007/0088681 | A1 | 4/2007 | Aravamudan et al. |
| 2007/0130128 | A1 | 6/2007 | Garg et al. |
| 2007/0143567 | A1 | 6/2007 | Gorobets |
| 2007/0150606 | A1 | 6/2007 | Flinchem et al. |
| 2007/0219984 | A1 | 9/2007 | Aravamudan et al. |
| 2007/0219985 | A1 | 9/2007 | Aravamudan et al. |
| 2007/0255693 | A1 | 11/2007 | Ramaswamy et al. |
| 2007/0260703 | A1 | 11/2007 | Ardhanari et al. |
| 2007/0266021 | A1 | 11/2007 | Aravamudan et al. |
| 2007/0266026 | A1 | 11/2007 | Aravamudan et al. |
| 2007/0266406 | A1 | 11/2007 | Aravamudan et al. |
| 2007/0271205 | A1 | 11/2007 | Aravamudan et al. |
| 2007/0276773 | A1 | 11/2007 | Aravamudan et al. |
| 2007/0276821 | A1 | 11/2007 | Aravamudan et al. |
| 2007/0276859 | A1 | 11/2007 | Aravamudan et al. |
| 2007/0288456 | A1 | 12/2007 | Aravamudan et al. |
| 2007/0288457 | A1 | 12/2007 | Aravamudan et al. |

FOREIGN PATENT DOCUMENTS

| | | |
|---|---|---|
| WO | WO-2004/031931 A1 | 4/2004 |
| WO | WO-2005/033967 A3 | 4/2005 |
| WO | WO-2005/084235 A2 | 9/2005 |

OTHER PUBLICATIONS

Gadd T.N., Phonix: The Algorithm, Program 24(4), Oct. 1990, pp. 363-369.

Dalianis, Improving Search Engine Retrieval Using a Compound Splitter for Swedish, Abstract of Presentation At Nodalida 2005—15th Nordic Conference on Computational Linguistics, Joensuu Finland, May 21-22, 2005. Retrieved Jan. 5, 2006 From HTTP://PHON.JOENSUU.FI/NODALIDA/ABSTRACTS/03.SHTML.

Silfverberg et al., Predicting Text Entry Speed on Mobile Phones, Proceedings of the ACM Conference on Human Factors in Computing Systems—CHI 2000. pp. 9-16.

Mackenzie et al., Letterwise: Prefix-Based Disambiguation for Mobile Text Input, Proceedings of the ACM Symposium on User Interface Software and Technology—UIST 2001, pp. 111-120.

U.S. Appl. No. 60/548,589, filed Sep. 1, 2005, Flinchem.

U.S. Appl. No. 11/855,661, Venkataraman et al.

U.S. Appl. No. 11/862,917, Aravamudan.
U.S. Appl. No. 11/939,086, Ramakrishnan et al.
U.S. Appl. No. 12/018,566, Venkataraman et al.
Digital Video Broadcasting, http://www.dvb.org (Oct. 12, 2007).
Good, N. et al., Combining Collaborative Filtering with Personal Agents for Better Recommendations, in Proc. of the 16th National Conference on Artificial Intelligence, pp. 439-446, Orlando, Florida, Jul. 18-22, 1999.
International Search Report, International Application No. PCT/US06/25249, mailed Jan. 29, 2008 (2 pages).
International Search Report, International Application No. PCT/US06/33204, mailed Sep. 21, 2007 (2 pages).
International Search Report, International Application No. PCT/US06/40005, mailed Jul. 3, 2007 (4 Pages).
International Search Report, International Application No. PCT/US07/65703, mailed Jan. 25, 2008 (2 pages).
International Search Report, International Application No. PCT/US07/67100, mailed Mar. 7, 2008 (2 pages).
Matthom, "Text Highlighting in Search Results", Jul. 22, 2005. Available at www.matthom.com/archive/2005/07/22/text-highlighting-in-search-results; retrieved Jun. 23, 2006. (4 pages).
Mokotoff, Soundexing and Genealogy, Available at http://www.avotaynu.com/soundex.html, retrieved Mar. 19, 2008, last updated Sep. 8, 2007 (6 pages).

Review of Personalization Technologies: Collaborative Filtering vs. ChoiceStream's Attributized Bayesian Choice Modeling, Technology Brief, ChoiceStream Technologies, Cambridge, MA, Jul. 2007.
Talbot, David. "Soul of a New Mobile Machine." *Technology Review: The Design Issue* May/Jun. 2007. (pp. 46-53).
Wikipedia's entry for Levenshtein distance (n.d.). Retrieved Nov. 15, 2006 from http://en.wikipedia.org/wiki/Levenshtein_distance.
Written Opinion of the International Searching Authority, International Application No. PCT/US06/25249, mailed Jan. 29, 2008 (4 pages).
Written Opinion of the International Searching Authority, International Application No. PCT/US06/33204, mailed Sep. 21, 2007 (3 pages).
Written Opinion of the International Searching Authority, International Application No. PCT/US06/40005, mailed Jul. 3, 2007 (4 Pages).
Written Opinion of the International Searching Authority, International Application No. PCT/US07/65703, mailed Jan. 25, 2008 (4 pages).
Written Opinion of the International Searching Authority, International Application No. PCT/US07/67100, mailed Mar. 7, 2008 (3 pages).

* cited by examiner

METHOD AND SYSTEM FOR INCREMENTAL SEARCH WITH REDUCED TEXT ENTRY WHERE THE RELEVANCE OF RESULTS IS A DYNAMICALLY COMPUTED FUNCTION OF USER INPUT SEARCH STRING CHARACTER COUNT

CROSS REFERENCE TO RELATED APPLICATIONS

This application claims benefit of the following patent application, assigned to the assignee of the present application and which is incorporated by reference herein in its entirety: U.S. Provisional Patent Application Ser. No. 60/695,463 filed Jun. 30, 2005, entitled "Method And System For Incremental Search With Minimal Text Entry On Television Where The Relevance Of Results Is A Dynamically Computed Function Of User Input Search String Character Count."

BACKGROUND OF THE INVENTION

The present invention relates to data search techniques, and more particularly, to techniques for performing searches for television content and channels and other items.

User interfaces for finding television content in early television systems were relatively simple. Television viewers could tune to a channel to locate desired content by entering a channel number or clicking channel navigation (up/down) buttons on the television or on a remote control device. User interfaces have evolved over time to more complex and elaborate interfaces such as interactive EPGs (Electronic Program Guides) now commonly used for browsing and searching for television content.

There has been significant recent proliferation in content choices for television viewers. The increase in content choices has resulted largely from channel proliferation, content disaggregation, and an increase in content source options. With this proliferation of content choices, conventional user interfaces, particularly EPGs, have proven inadequate in helping users quickly and easily find channels and content of interest.

The number of television channels available to television viewers, e.g., subscribers of satellite and cable networks, has proliferated, in many cases beyond double digits and approaching triple digits. This has made it particularly difficult for users to remember the channels by their numbers. Users are more likely to forget the number assigned to a channel than the symbolic name assigned to the channel (e.g., CNN, NBC, PBS etc.). Moreover, when a user is mobile, i.e., not at his or her usual home, and desires to view a given channel, e.g., CNN, his or her memory of the channel number may not be useful since CNN would typically be assigned a different channel number by different operators. Additionally, the growth in the number of channels has also made use of conventional two dimensional grid-based EPG interfaces tedious in finding particular programs of interest and channels.

Early VCRs (video cassette recorders) enabled users to time-shift programs so that the programs could be watched whenever desired. The advent of PVRs (Personal Video Recorders) has, however, immensely catalyzed this disaggregation of programs, further diminishing the value of the channel paradigm. A direct consequence of this phenomenon is the proliferation of available content that can be viewed at any given time.

Additionally, there has been a significant increase in content source options for viewers. As the bandwidth for data transmission to homes has increased, new sources of content such as VOD (video-on-demand) and IPTV (Internet Protocol TV) have become available. This has further increased the available content accessible to viewers.

The success of Google search from a desktop-based PC interface has established the fact that the simplicity of the search interface combined with the correct relevance ordering of results in a flat linear space are important for the ubiquitous adoption of a search engine. Television, PDA devices and other devices with limited input capabilities and display constraints (the display space on a television is insufficient given the large fonts needed to be visible at a distance) pose a challenge to create an easy interface like the desktop-based search, where text entry can be done using a QWERTY keyboard. Text input limitations for television-based search makes it important to facilitate reduced text entry. Furthermore support for dynamic retrieval of results for each character entered is important for increasing the likelihood of a user arriving at desired result without having to enter the full search text. The relevance ordering of results during dynamic results retrieval for each character entered should be such that the user sees the desired results with the entry of the first few characters.

This problem is even more challenging when designing a non-intrusive search interface for television where the results display cannot accommodate more than a few results at any point in time, in order to remain non-intrusive. The correct relevance of ordering is important in this case to avoid the user from having to scroll down to see additional results. The display space constraint increases the importance of personalizing the results retrieval so that the user can get to the results with significantly reduced effort.

SUMMARY OF EMBODIMENTS OF THE INVENTION

A method and system in accordance with one or more embodiments of the invention are provided for performing incremental searches with text entry reduced to delimited prefix substrings or acronyms where the relevance ordering of results is computed as a function of the number of characters entered by a user, where the characters represent one or more prefixes of the input query. The search space is divided into multiple subspaces, with the applicability or non-applicability to incremental search at any given instant being dynamically computed as a function of the number of characters entered by the user at that instant. This method enables selective relevance boosting (or suppression) of subspaces via configurable parameters appropriate to the application context of the search, with the boosting (or suppression) of subspaces occurring as a function of the number of characters entered by the user. Embodiments of the present invention also describe a way to allocate display space for one or more key subspaces in the first set of pages of results, such that a broad representation of a plurality of subspaces is shown to the user to increase the likelihood of a desired match. The allocation of display space to subspaces is also a function of the number of characters entered by the user. This allocation of display space is implicitly or explicitly personalized over time.

In addition to the different subspace biasing methods described above in embodiments of the present invention, the relevance contribution of any term (i.e., an individual word or phrase that is a part of the title, keyword or any other portion of the meta-content) to the computed relevance of any given result for a search query is governed by the information content of that term in relation to other terms describing the same content; this term relevance contribution itself varies as a function of the character count. The method in accordance with various embodiments of the present invention enables the rendering of results from multiple subspaces as a flat linear list without visible subspace partitioning, empowering the user to search and retrieve results across several subspaces without having to either explicitly specify in advance a particular subspace of interest or navigate different subspaces while viewing results. Embodiments of the present invention thus enable the user to find the desired result easily by reducing the effort involved in both the process of searching for results and subsequently navigating the results space.

In accordance with one or more embodiments of the invention, a method and system are provided for processing a search request received from a user operating a text input device. The search request is directed at identifying a desired item from a set of items. Each of the items of the set of items has one or more associated terms. The method includes receiving a query input from a user directed at identifying the desired item. The query input comprises one or more characters input by the user on the text input device. As each character of the query input is received from the user, a group of items having one or more terms matching the characters received thus far of the query input is dynamically identified. The items in this group of items are ordered based on relevance values of the terms matching the characters and on the number of characters of the query input used in identifying the group of items. Identification of the group of items as ordered is transmitted to the user to be displayed on a device operated by the user.

These and other features and advantages of the present invention will become readily apparent from the following detailed description, wherein embodiments of the invention are shown and described by way of illustration of the best mode of the invention. As will be realized, the invention is capable of other and different embodiments and its several details may be capable of modifications in various respects, all without departing from the invention. Accordingly, the drawings and description are to be regarded as illustrative in nature and not in a restrictive or limiting sense, with the scope of the application being indicated in the claims.

DESCRIPTION OF THE PREFERRED EMBODIMENTS

Although many of the examples illustrated herein concern a television viewer searching for television content items and television channels, the concepts set forth in these examples are not limited to searching for television content items and channels. In general, these concepts can apply to processing search requests in a variety of environments in which particular data items or content is sought in response to a user query.

Briefly, as will be described in further detail below, in accordance with one or more embodiments of the invention, methods and systems are provided for identifying data items (such as, e.g., a television content item or channel) desired by a person performing a search on a device (such as, e.g., a television viewer using a remote control or a user of a phone, PDA or other mobile computing device) from a set of available data items.

Television content items can include a wide variety of video/audio content including, but not limited to, television programs, movies, music videos, video-on-demand, or any other identifiable content that can be selected by a television viewer.

A user can enter into a search device having a text input interface a reduced text search entry directed at identifying the desired data item. The text can be one or more characters, which can be any alphanumeric character, symbol, space or character separator that can be entered by the user. Each data item has one or more associated descriptors, particularly names in a namespace relating to the desired data items. The descriptors specify information about the data item. If the data item is television content or channel, the information can include, e.g., information on titles, cast, directors, descriptions, and key words. The names are composed of one or more words that can be either ordered or unordered. The user's search entry comprises one or more prefix substrings that represent a name or names in the namespace. A prefix substring of a word in a name captures information from the word and can be a variable length string that contains fewer than all the characters making up the word.

Figure 1:
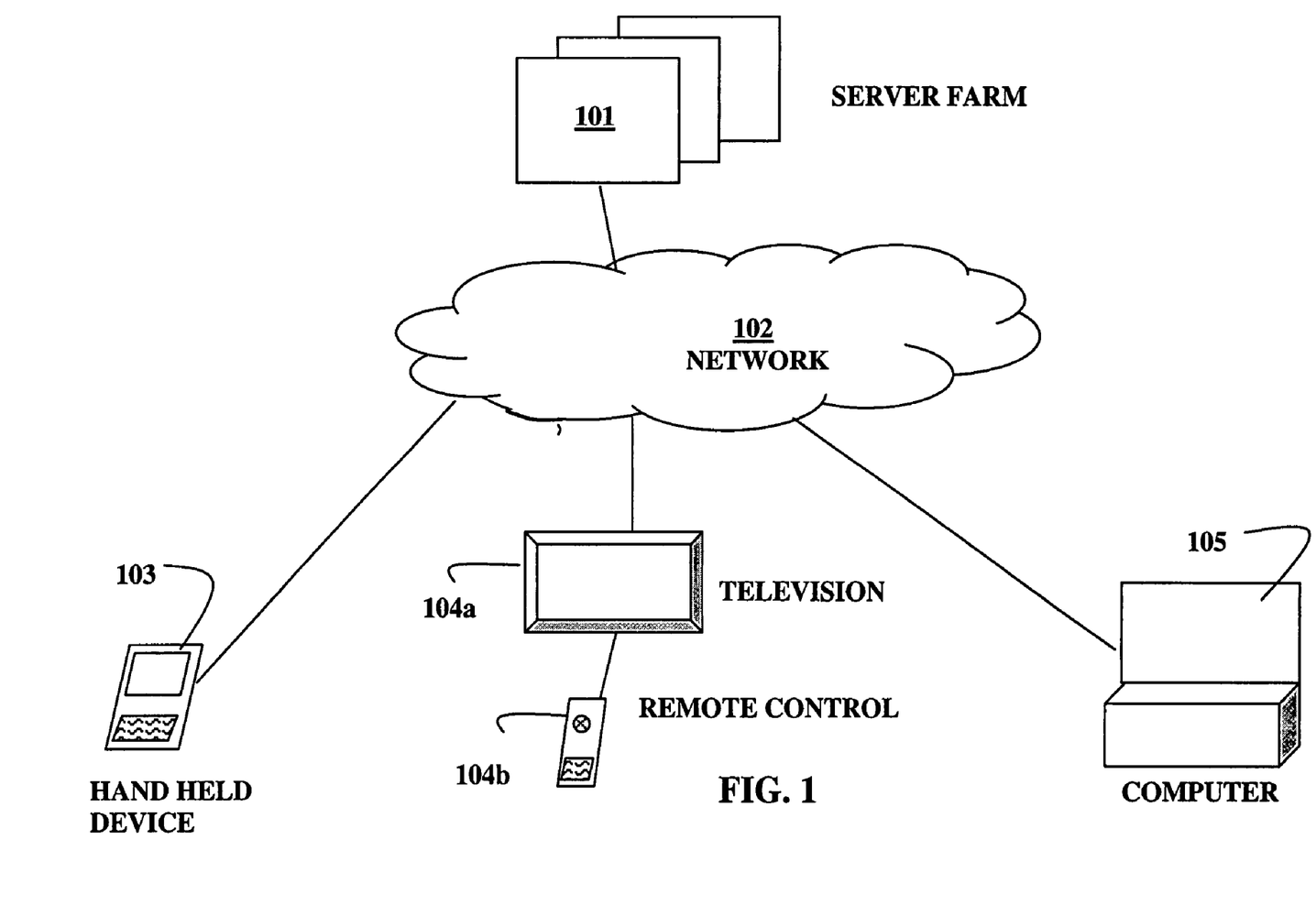
FIG. 1 illustrates a reduced text entry search system in accordance with one or more embodiments of the invention being used in various device and network configurations.

FIG. 1 shows an overall system 100 for search with reduced text entry using a wide range of devices in accordance with one or more embodiments of the invention. Although FIG. 1 illustrates a network-based search, the concepts described herein are also applicable to a search that a particular search device performs locally. A server farm 101 serves as a source of search data and relevance updates, with the network 102 functioning as the distribution framework. The composition of the actual distribution within the network is not critical—the network 102 could be completely wired, completely wireless, or a combination of wired and wireless connections. Examples of possible networks can include cable television networks, satellite television networks, I.P.-based television networks, and networks for mobile devices such as wireless CDMA and GSM networks. The search devices could have a wide range of interface capabilities such as a hand-held device 103 (e.g., a phone, PDA or other mobile device) with limited display size and overloaded or small QWERTY keypad, a television 104a coupled with a remote 104b having an overloaded or small QWERTY keypad, and a Personal Computer (PC) 105 with a full QWERTY keyboard and large display.

Figure 2:
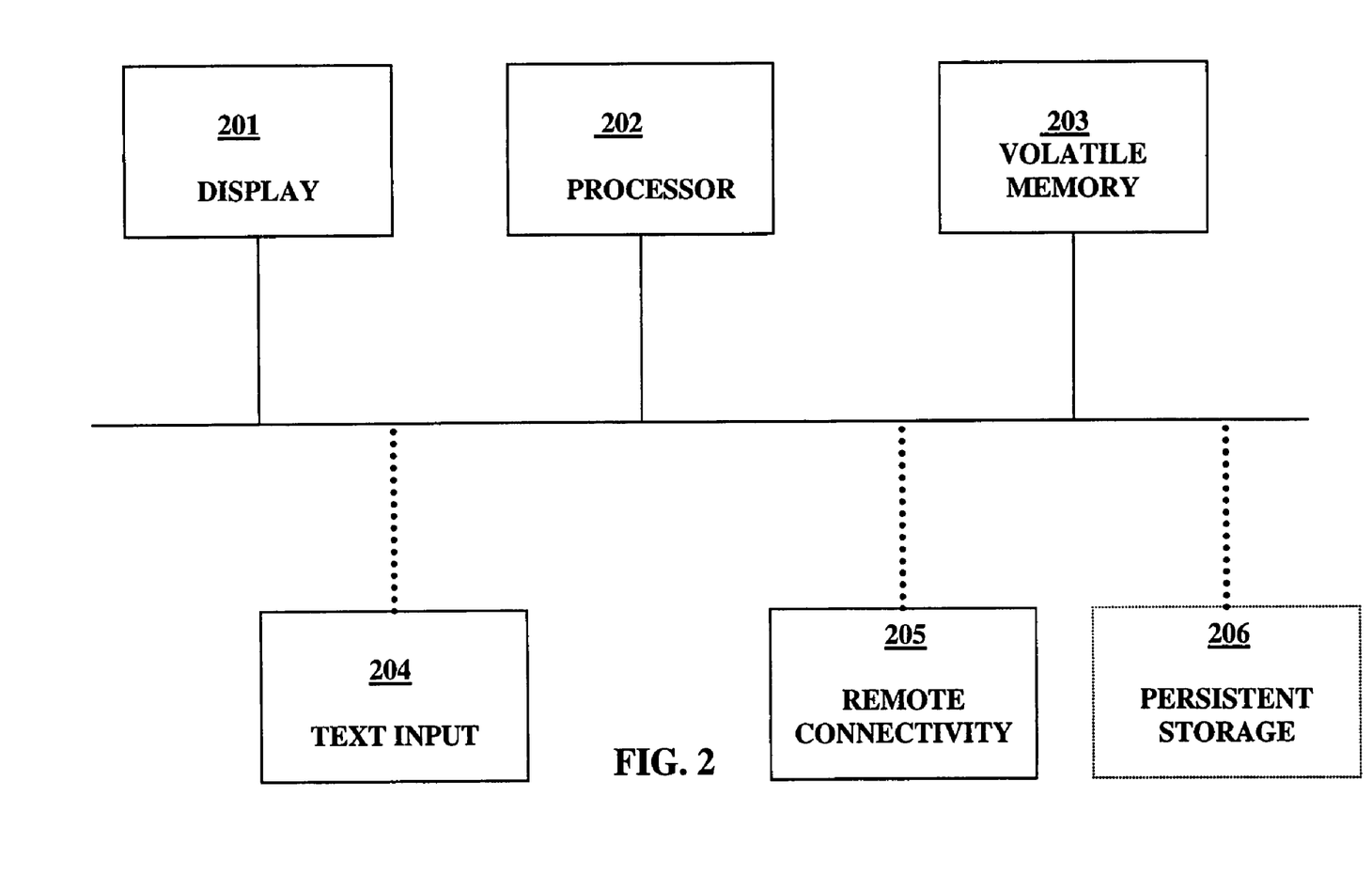
FIG. 2 illustrates various device configuration options for performing searching in accordance with one or more embodiments of the invention.

FIG. 2 shows several possible configurations of the search device from the system 100 illustrated in FIG. 1. In one embodiment, a search device such as a PC 105 has a display 201, a processor 202, a volatile memory 203, a text input interface 204 (which is either on the device itself, or is implemented via a wireless remote control 104b), remote connectivity 205 to a server 101 through a network 102, and a persistent storage 206.

In another embodiment, a search device such as a hand-held device 103 may not include local persistent storage 206. Such a hand-held device 103 would include remote connectivity 205 to submit the query to a server 101 and retrieve results from the server 101. In yet another embodiment, the search device 103 may not include remote connectivity 205. For such an embodiment, the search database may be locally resident on a local persistent storage 206. The persistent storage 206 may be a removable storage element such as SD, SmartMedia, CompactFlash card, or any of other such storage elements known in the art.

In one embodiment, a search device includes remote connectivity 205 and persistent storage 206 for search (e.g., a television 104a), and the search device may use the remote connectivity for search relevance data update, or for the case where the search database is distributed on the local storage 206 and on the server 101. In one embodiment, a television 104a may have a set-top box with a one-way link to a satellite. In this embodiment, some or all search data, including relevance updates, may be downloaded to the search device through the satellite link so that a search can be performed locally.

Figure 3:
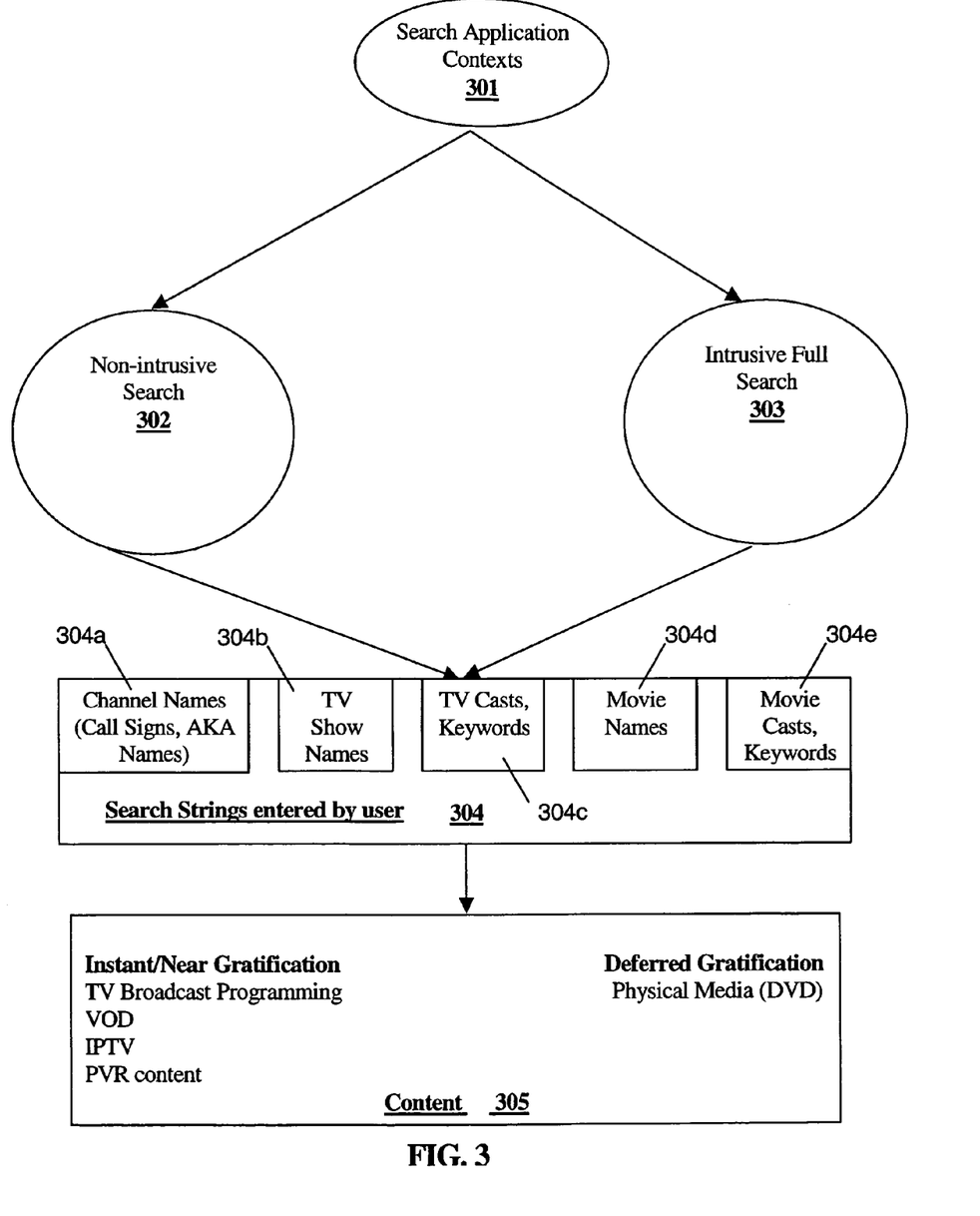
FIG. 3 illustrates the various application contexts along with the search terms specified by the user to retrieve different forms of content in accordance with one or more embodiments of the invention.

FIG. 3 illustrates the various application contexts 301 along with the search string elements 304a-304e used to retrieve different forms of content. In one embodiment, the application context for search is a non-intrusive interface 302 (an interface that occupies a small portion of the screen and preferably does not significantly occlude or interfere with the simultaneous viewing of content) to search for a program that is available for instant gratification (available for instant viewing) and perform an action on it such as tuning to the program (if it is being broadcast), initiate a recording, or download/stream (if it is an internet based content). One challenge imposed by a non-intrusive interface is that because of its generally small size, there is a limited space available for displaying results, e.g., two to three lines, with the rest of the results being accessible by scrolling down. An intrusive search interface 303 for a television display (an interface that occupies the full screen or a large part of it) poses challenges too, since the number of results that can be displayed with a font that is visible at 10 feet distance, is limited to around 8 results. In the case of the intrusive interface, the application context could be further diversified into smaller context search such as search for a movie or a TV show. Searching for results in any of these application contexts can use search strings 304 that identify the desired content or channel. The text strings include information such as the channel names, TV show names, TV casts and keywords, movie names, casts and/or keywords. The input text strings do not necessarily include complete information blocks. For example, the input text string could be variable size prefix substrings from one or more of these subspaces. The input text string could alternatively be an acronym or abbreviation that represents the name of a TV show, TV network, etc. The relevance values associated with these strings determines the ordering of results, which can provide direct access to content 305 such as TV broadcast programming, video-on-demand (VOD), etc.

Figure 4:
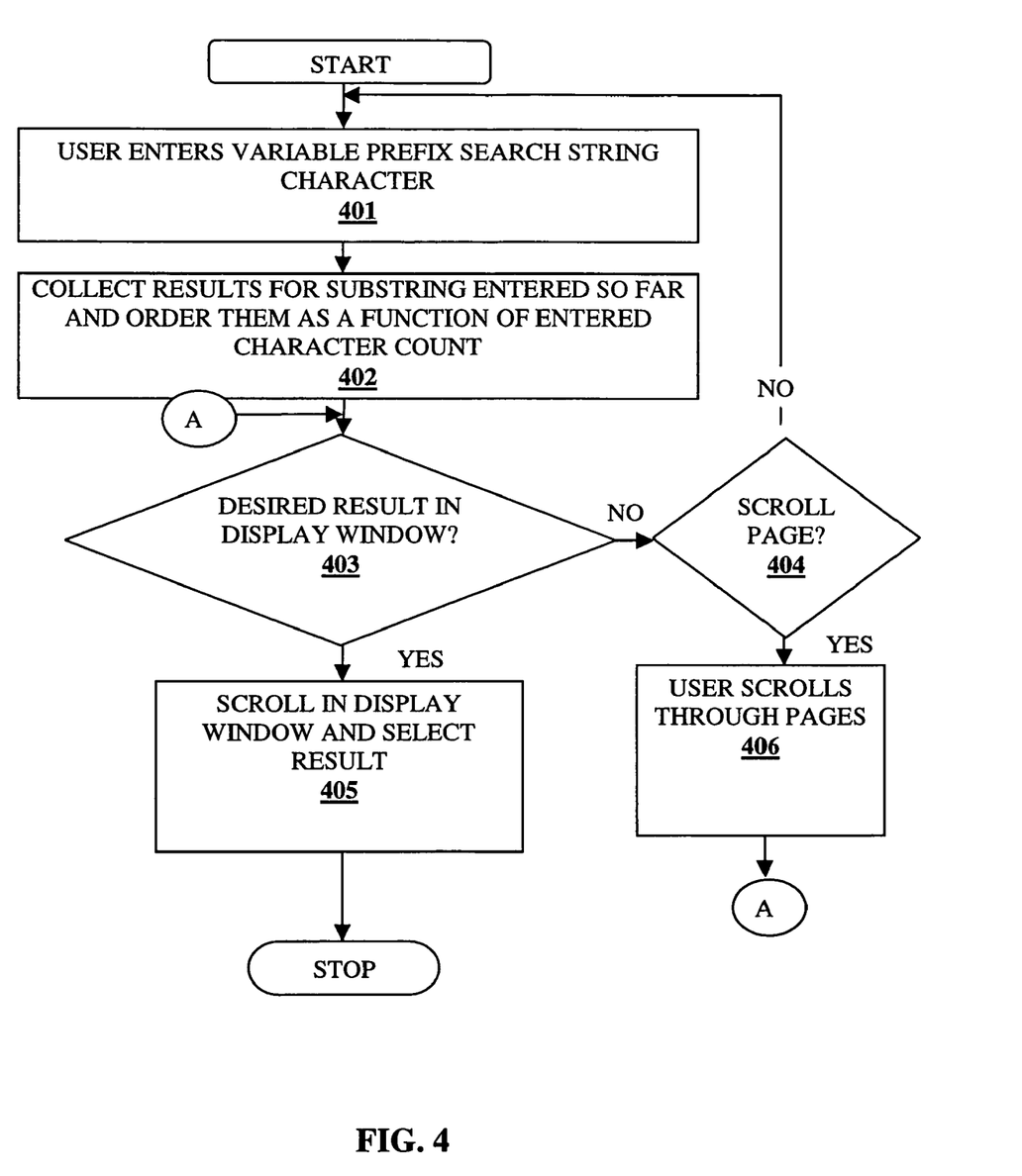
FIG. 4 illustrates a process of user starting a new search and entering text and arriving at the desired result in accordance with one or more embodiments of the invention.

FIG. 4 illustrates a process of the user starting a new search, entering characters and arriving at the desired result. A user enters a search string character at 401, which could be a variable size prefix of the intended query. For example, to represent "Brad Pitt," the user may enter B P, BR P, B PI etc.). The system dynamically retrieves results at 402 for the cumulative substring of characters the user enters and orders the collected results based on (i) the relevance of the matched terms (explained in further detail below), and (ii) the number of characters the user entered. The results are displayed in the results window. If the user sees the result in the display window at 403, the user can scroll to the desired result within the displayed window and selects the desired result at 405. If the desired result is the first entry in the display window, it can be selected by default obviating the need to scroll through the display window. The ordering of results in the display window is governed by a relevance function that is a domain specific combination of relevance (e.g., popularity, temporal relevance, and location relevance) and the number of characters entered by the user. In an exemplary embodiment, when a user is searching for a restaurant using a phone or Personal Digital Assistant (PDA) with GPS capabilities, the listings are ordered in descending order of the most popular restaurants in that area. If the user entered "NBA," the system lists the games in order of temporal relevance such as those in progress or are scheduled to begin in the near future are listed first. If the desired result is not in the display window, the user could decide at step 404 to either scroll down the display window linearly or page by page to reveal more results at 406 or enter more characters at 401. If the user does not reach the result due to a misspelled entry or due to the case of a word whose uniqueness (e.g., Tom Brown, Michael Brown) is embedded in the suffix of the words of the query (as opposed to the prefix), the user either goes back to the first word and enters more characters, or erases one or more of the typed characters and re-enter characters in order to reach the desired result. The dynamic update of results for each character entry enables the user to recover from an error during the text entry process itself, in contrast to discovering there are no results match after typing the entire text.

Figure 5:
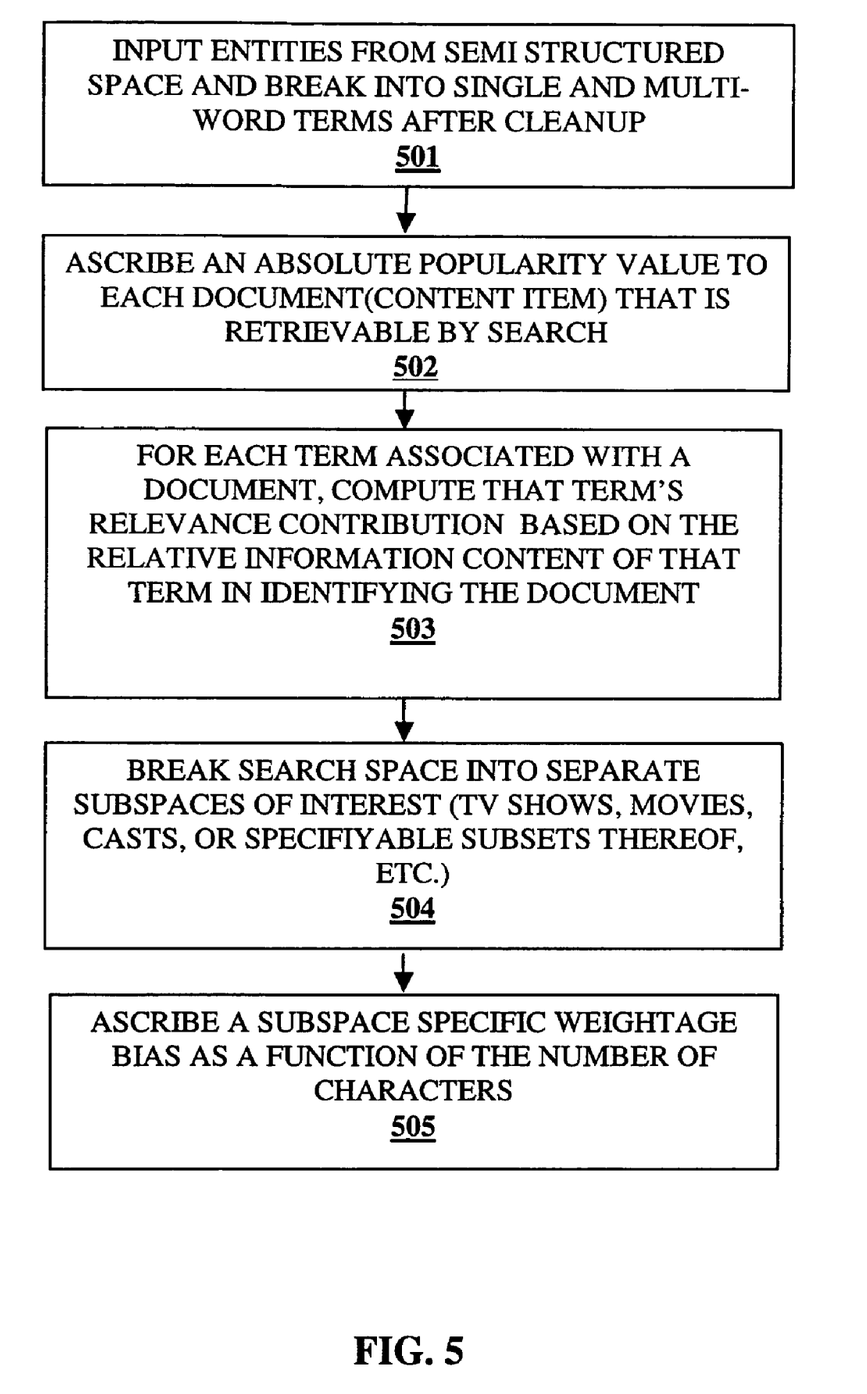
FIG. 5 illustrates a preprocessing step to ascribe priorities to searchable content and the computation of relevance for each term that can retrieve content in accordance with one or more embodiments of the invention.

FIG. 5 illustrates various steps in the pre-processing phase for ascribing content priorities and term relevance in accordance with one or more embodiments of the invention. The input to this phase is a semi-structured space of any size composed of entities (e.g., titles, cast, directors, description, key words) with associated metadata. This semi-structured search space could range in size from the size of a PDA phone book to a large subspace obtained by a focused web crawl followed by relevant text processing to derive entities. In scenarios where the search space size is large, it is possible to organize the space into smaller sub-spaces based on a categorization scheme. In the example shown in FIG. 5, the first step 501 is the breaking up of entities into terms (e.g., Tom Hanks, Secret Discoveries in Ancient China). As used herein, a "term" is a set of one or more ordered or unordered words. In one embodiment, the system 100 considers multiple permutations of the words in the entity as candidate terms (e.g., Secret Discoveries of Ancient China, Discoveries of Ancient China, Ancient China, China). Considering multiple permutations allows searching a given entity using variable prefixes of any of the candidate terms. The content item (also referred to herein as a document, e.g., a particular movie) is itself assigned a popularity value 502. In the next step 503, for each term identifying a document, a relevance value is computed based on the information content of term. The instantaneous relevance of any given document to a query string depends on the absolute popularity of that document and the relative relevance contributions of the associated terms matched by the search query. Also, the relevance of that term is not a constant, but is rather a function of the number of characters that forms a prefix of that term. For example, the prefix string "ev" of the term "events" in a TV show "Live Summer Events" would not only have a lower relevance value than that ascribed to the full term "events," it would also have a lower relevance value in comparison to the term "everybody" in "Everybody Loves Raymond." The relevance of a prefix of a one word term may have a higher relevance than that of a prefix of a multi-word term. (For example, the prefix "ev" may have a higher relevance to represent a movie called "Eve" than that of the relevance of "ev" to represent "Live Summer Events"). The next step 504, involves identifying various subspaces of interest. The creation of subspaces may be based on a wide range of criteria including, but not limited to, (1) broad genre based subspace categorization, (2) individual term weighting-based categorization, or (3) personal search history (time sensitive and/or user specific) based categorization. These subspaces may be optionally exposed as filters (although with the proper ordering, the user would not need to use this filter) for search and can be explicitly applied by the user before, during, or after a search string entry. The categorization into subspaces enables a flattened linear output of results even on a system with small display space, since each subspace can be selectively biased on a per character basis as described below, to enable optimal ordering of results on the display.

The final phase 505 involves ascribing a subspace-specific bias. This bias is a function of the number of characters entered. This bias causes certain subspace results to have a higher relevance than other subspaces. As is illustrated in greater detail below, a channel name subspace may have a relevance boost for the first character to ensure, e.g., that only channels appear first in the results space when only one character is entered.

Figure 6A:
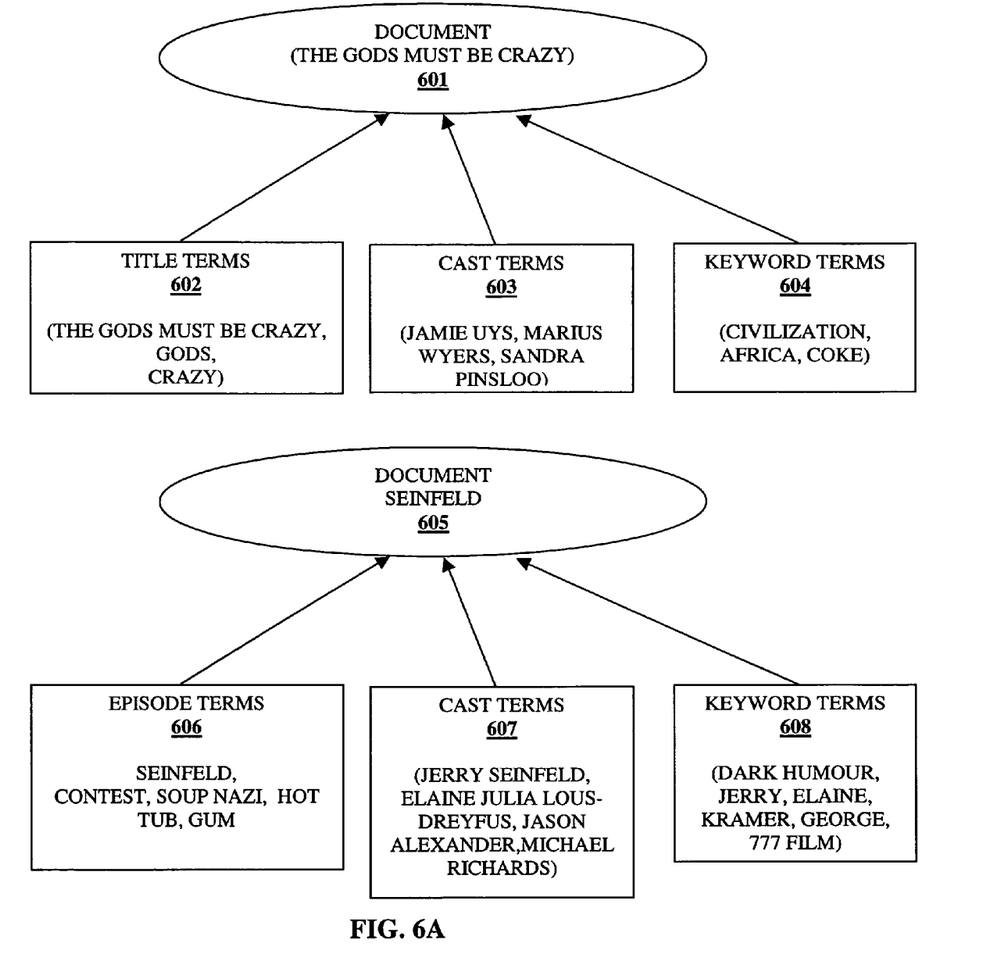
FIG. 6A illustrates the different type of terms or combinations thereof that can retrieve content. The illustration depicts exemplary terms for a movie and a TV serial.

FIG. 6A illustrates a searchable document 601, in this case a movie (The Gods Must Be Crazy), along with the terms that lead to its discovery by search. Each term set (title 602, casts 603, and keywords 604) belongs to a separate subspace, so that the relevance for a subspace can be selectively biased. FIG. 6A also illustrates an example of a TV serial (Seinfeld 605) shown with episode title terms 606, cast terms 607 and keyword terms 608.

Figure 6B:
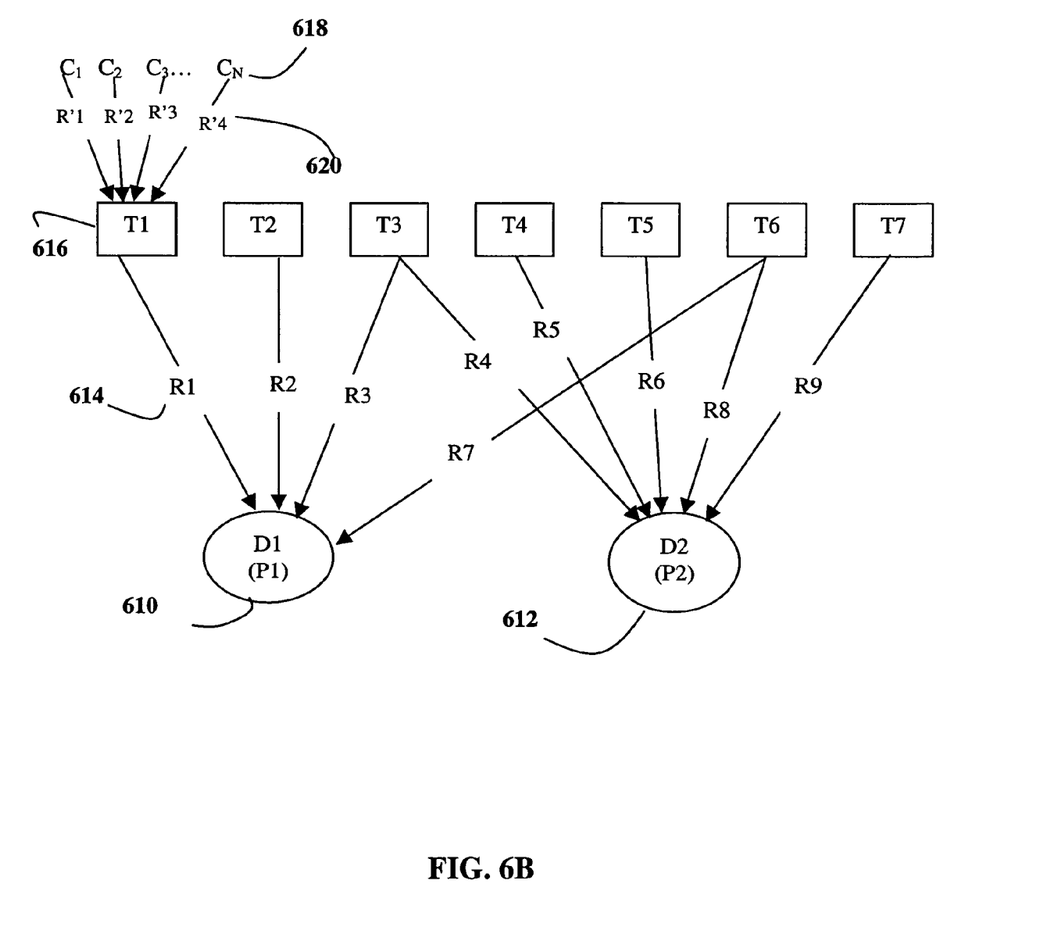
FIG. 6B illustrates the relevance of terms as it relates to the popularity of the discoverable documents.

FIG. 6B illustrates two documents 610, 612 having popularity values D1 and D2. The documents are discoverable by terms 616 (T1 through T7). The relevance values 614 (R1 through R9) are computed as a function of the document relevance it links to. A term may have different relevance values for different documents 610, 612 as illustrated by terms T3 (R3 and R4) and T6 (R7 and R8). For example, the term "lost" in "lost in translation" could have a different relevance in "raiders of the lost ark." The discoverability of a document relies on the relevance of its terms. The search query string 618 is shown linking to the term T1 through different relevance values 620, depending upon the number of characters entered.

Figure 7:
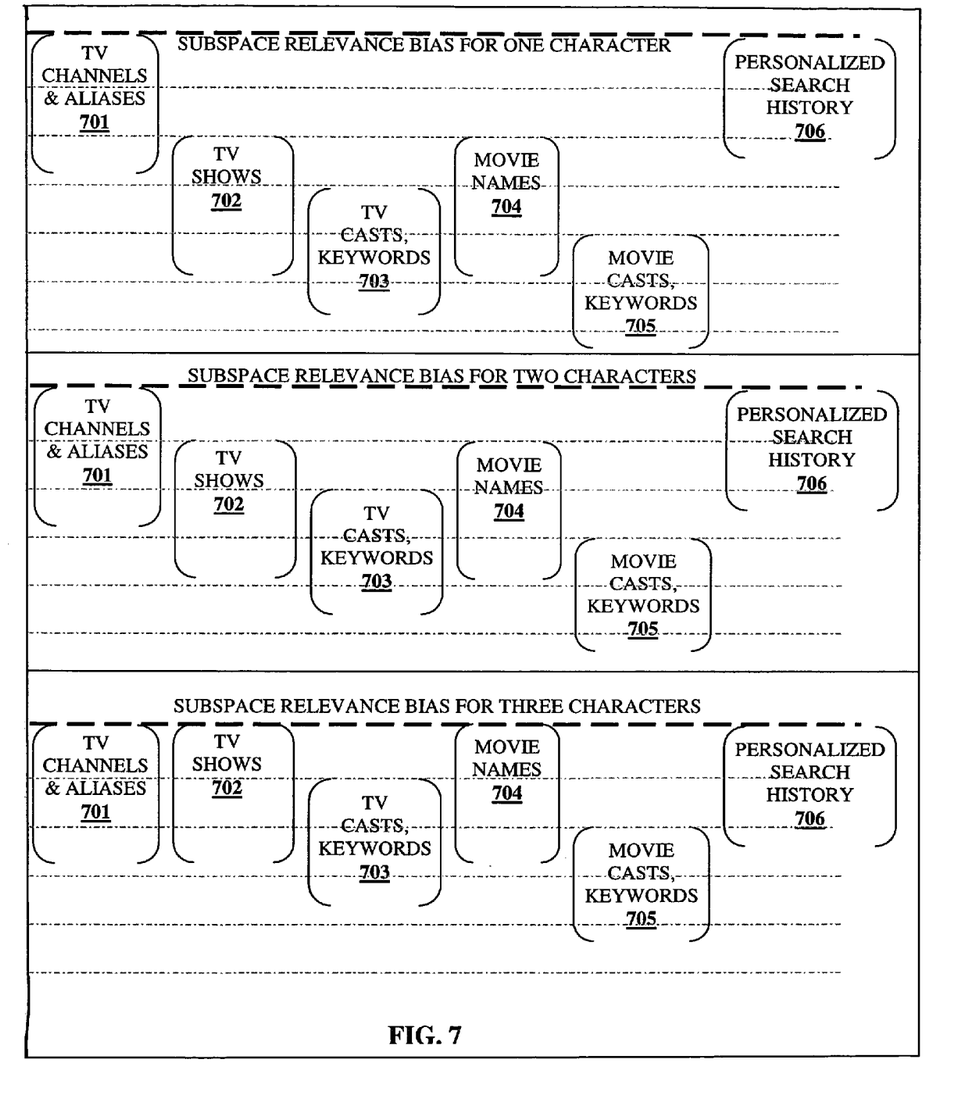
FIG. 7 illustrates the dynamic adjustment of subspace biases as each character is entered in accordance with one or more embodiments of the invention.

FIG. 7 illustrates this selective biasing of different subspaces 701-705 as a function of the number of characters entered. In this exemplary embodiment, the bias value of a subspace is the output of a nonlinear function. A personalized search history subspace 706 is dynamically created and is composed of items from other subspaces. The relevance of elements in this subspace would be a function of the both time, content availability and popularity. For example, a user may type "C" in the mornings to access the children's program "Caillou", but in the evening user may type "C" to access the news network "CNN." The key role of subspace biasing is to facilitate access to the desired results on the visible results list within the entry of a small number of characters, e.g., the first 3 to 4 characters. Beyond this, the entered string generally becomes sufficiently unique for the result to percolate up to the top of the shelf, regardless of the subspace the term belongs. A static character count independent of any subspace biasing would relegate some subspaces to always be occluded by results from the boosted subspace results. For example, if the channel space were given a sufficiently large bias over other subspaces such that even the lowest relevance channel is higher than any other subspace element, then even when the user enters "SE", low popularity channels such as SETANT or SEASON would occlude "SEINFELD" from showing up on the displayed results—the user would have to scroll down to get to Seinfeld, if only two characters were entered. The selective biasing of the described embodiment enables the "TV show" subspace to get a boost after the first character is entered so that it can contend and supersede the low popularity channel names, or even all the channel names, if the biasing is appropriately set. The character-based relevance biasing of subspaces provides the flexibility in controlling what is displayed in an easily configurable and scalable manner.

As used herein, the biasing of one subspace over another refers to the relative preferential positioning of subspaces by boosting or suppression.

One advantage of a user-entered character count based subspace relevance biasing in accordance with one or more embodiments of the invention is described further below:

Consider an example in which the user enters a prefix string $P = C_1, C_2, C_3, \ldots C_i \ldots C_N$, where $1 \leq i \leq N$. One or more of the characters $C_i$ ($1 \leq i \leq N$), could be a word separator (e.g., space character)—the query string could thus be a multi-prefix query string. Let $P_i$ denote a multi-prefix string where $1 \leq i \leq N$. Let the subspaces be $S_1, S_2, \ldots S_M$ and the initial bias of the subspaces be $Si^{min} \geq Sj^{max}$, $1 \leq i,j \leq M$, i.e., the lowest relevance element in $S_i$ has a higher relevance than the most relevant element in $S_j$. Consider the display space size to be $D_{max}$. The user would have to scroll down if the number of results exceeds $D_{max}$.

Case 1: $P_i (1 \leq i < N)$ has a no match ($Match[P_i, S_j] = \emptyset$, $1 \leq j \leq K-1$) with strings from subspaces $S_1, \ldots S_{K-1}$ ($1 < K \leq M$) but $P_{i+1}$ has a match ($Match[P_{i+1}, S_K] = \{m_K^1, m_K^2 \ldots m_K^r\}$ where $1 \leq r \leq n(S_K)$) (with n standing for the cardinality of $S_K$, $1 \leq i \leq N$), with strings from subspace $S_K$, $1 \leq K \leq M$. In this case "the character count based subspace biasing" system offers no distinct advantage in comparison to a static character count independent biasing of subspaces.

Case 2: $Pi (1 \leq i < N)$ has a match with strings from subspaces $S1, \ldots SK-1$ ($Match[Pi, Sj] = \{m_j^1, m_j^2 \ldots m_j^r\}$ where $1 \leq r \leq n(S_j)$, n standing for the cardinality of $S_j$ and $1 \leq j \leq K-1$) and $P_{i+1}$ has a match with strings from Subspace $S_K$ ($Match [P_{i+1}, S_K] = \{m_K^1, M_K^2 \ldots m_K^r\}$ where $1 \leq r \leq n(S_K)$, n standing for the cardinality of $S_K$). In this case if $\Sigma n(Match [P_i, S_j]) \geq D_{max} (1 \leq j \leq K-1)$, then the result from SK would be occluded by the matched elements from the subspace $S_1, \ldots S_{K-1}$ (note it may be occluded even for a value of $j < K-1$, if multiple results from a subspace match). The user would have to scroll down to view the result from $S_K$. It is this occlusion that character count based biasing in accordance with one or more embodiments of the invention addresses. The biasing allows for selective occlusion for a certain number of initial characters, and then makes the relevance space a level playing field for all subspaces gradually as the entered character count increases. By modifying the subspace biasing for each character, in this case, by increasing the bias of $S_K$, the result of $S_K$ has some likelihood of showing up within the top $D_{max}$ results. This promotion to the display list, might have happened at the exclusion of a result from one of the subspaces $S_1, \ldots S_{K-1}$. This may be a preferred behavior, i.e., no result is allowed to hold on to the precious display estate beyond a particular character count. As the subspaces are all made equal with the increase in character count, preference could be given for the results from the new subspaces, since the others would have been monopolizing the display space in this scenario. Also note that an excluded result that fell from its position in the top displayed set, would work its way back again into view if sufficient characters that form a larger prefix of that result is entered. This reclamation of lost position will naturally occur, with the entry of more characters—the uniqueness of the string would help bring it back up.

The other two cases, (1) both $P_i$ and $P_{i+1}$ having no match with subspaces and (2)$P_i(1 \leq i < N)$ has a match with strings from subspaces $S_1, \ldots S_{K-1}$ but $P_{i+1}$ has no match, are not examined since they are uninteresting boundary cases offering no more information than the cases described above.

Figure 8A:
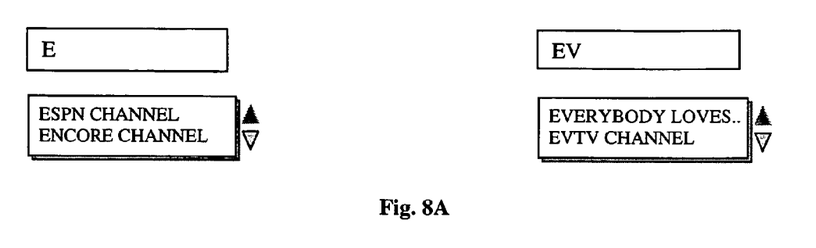
FIGS. 8A-8C illustrate the ordering of results as each character is entered for various exemplary search strings in accordance with one or more embodiments of the invention.
Figure 8B:
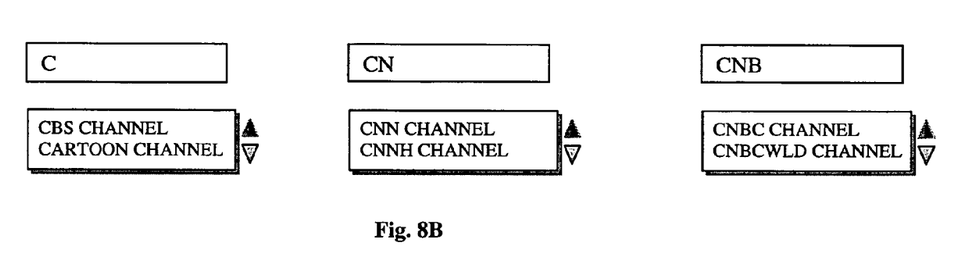
Figure 8C:
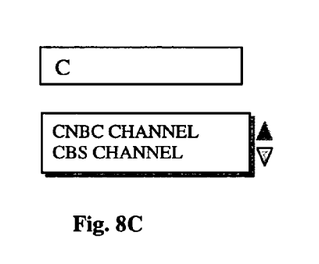

FIGS. 8A-8C illustrate examples of the ordering of results as each character is entered for various search strings. The first example (FIG. 8A) illustrates the case of a low popularity channel being superseded by a popular TV show "Everybody loves Raymond" on the entry of the second character. However, the first character entry only brings up channels since the subspace biasing for the first character as shown in FIG. 7 boosts the majority of channel names over all other subspaces. The second example (FIG. 8B) illustrates the user finding CNBC after entering three characters. The figure illustrates the scenario where the user is entering CNBC for the first time—the search history subspace has not been populated with this search yet. After regular sustained access to CNBC, over a period of time this term is added to the personal search history, and the relevance of this term continues to increase. At some point, the relevance of this item is boosted sufficiently to even supersede the popular channels with the same prefix as shown in FIG. 8C. Character count based biasing is independent of the number of terms represented by the input characters. For example, in the case of "Everybody Loves Raymond" user could have entered "E L" (E<space>L) instead of the query "EV". The biasing logic is the same in both cases and is independent of the fact that in one case the input characters represented one prefix (Everybody Loves . . . ), while the other represented two prefixes ("Every-Body Loves . . . ")

Figure 9:
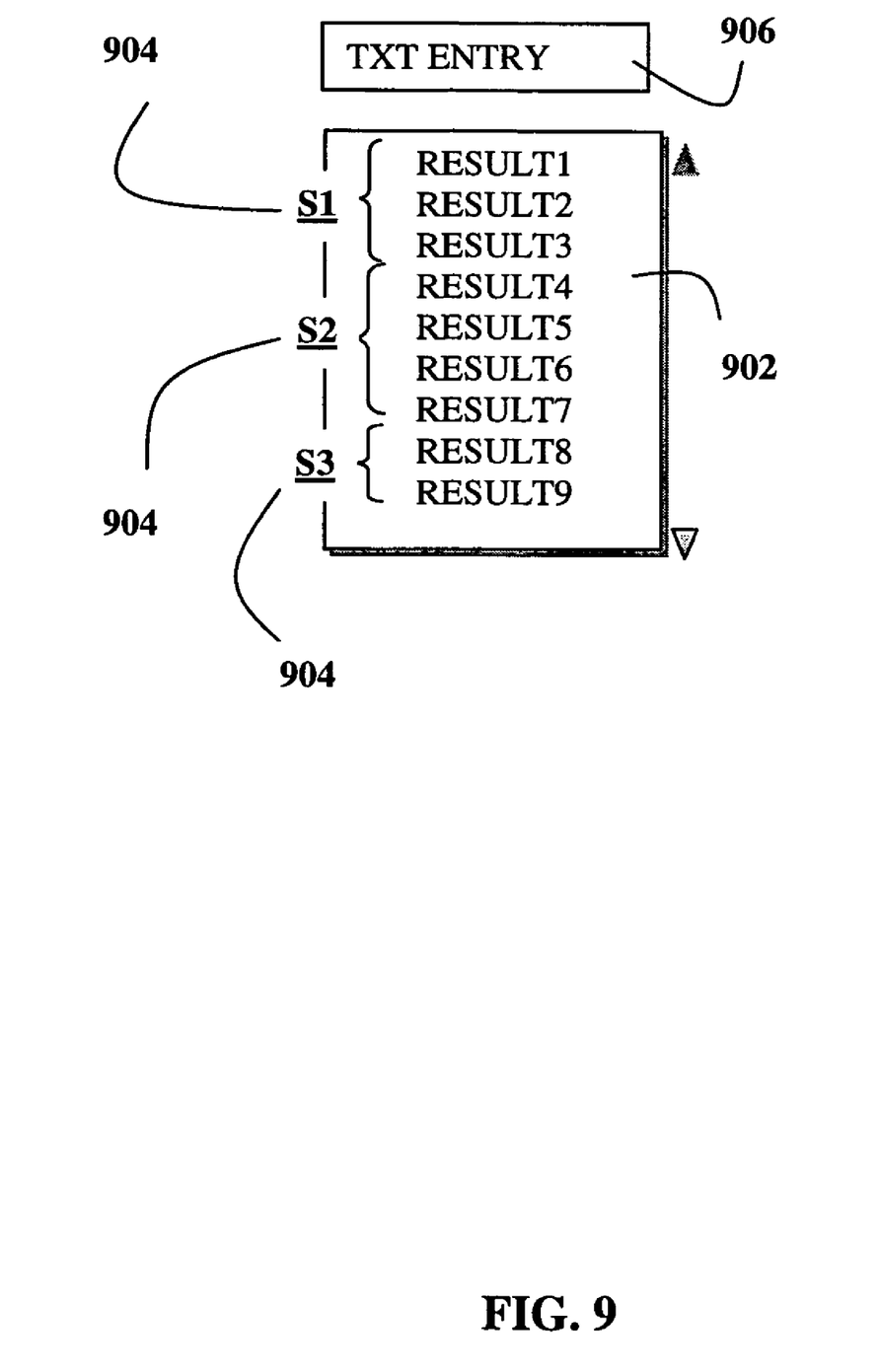
FIG. 9 illustrates allocating display space for certain subspaces in accordance with one or more embodiments of the invention.

FIG. 9 illustrates an embodiment where instead of biasing subspaces, certain number of rows on the display space 902 are allocated for certain subspaces 904. One advantage of this scheme is that regardless of the number of the results that match the term entered in text entry field 906, results from each subspace are guaranteed space in the display in the first set of pages of results, if any results qualify from these subspaces. This method enables the displayed results to represent a cross-section of the results, thereby increasing the likelihood that a particular result may be of interest to the user. The choice of subspaces that are allocated shelf space may change dynamically over time and usage of the system. For example, when a user enters "S" in the morning, the results display may be populated with "Sesame street" (for kids), "SBX morning news", etc., representing children and adults. The choice of subspaces to be used may be determined by knowledge of the household demographics, or implicitly with usage (i.e., information about tuning and recording usage patterns).

Methods of processing search queries from users in accordance with various embodiments of the invention are preferably implemented in software, and accordingly one of the preferred implementations is as a set of instructions (program code) in a code module resident in the random access memory of a computer. Until required by the computer, the set of instructions may be stored in another computer memory, e.g., in a hard disk drive, or in a removable memory such as an optical disk (for eventual use in a CD ROM) or floppy disk (for eventual use in a floppy disk drive), or downloaded via the Internet or some other computer network. In addition, although the various methods described are conveniently implemented in a general purpose computer selectively activated or reconfigured by software, one of ordinary skill in the art would also recognize that such methods may be carried out in hardware, in firmware, or in more specialized apparatus constructed to perform the specified method steps.

The invention may be embodied in other specific forms without departing from the spirit or essential characteristics thereof. The present embodiments are therefore to be considered in respects as illustrative and not restrictive, the scope of the invention being indicated by the appended claims rather than by the foregoing description, and all changes which come within the meaning and range of the equivalency of the claims are therefore intended to be embraced therein. Method claims set forth below having steps that are numbered or designated by letters should not be considered to be necessarily limited to the particular order in which the steps are recited.

The invention claimed is:

1. A method of processing a search request received from a user operating a hand-held text input device, the search request directed at identifying a desired item from a set of items, each of the items having one or more associated terms, the method comprising:

providing the set of items, the items having assigned popularity values to indicate a relative measure of a likelihood that the item is desired by the user;

for each item, associating a set of terms to describe the item and assigning a relevance value for each term based on a relevance of the term in identifying the item, the terms associated with the items being organized into searchable subspace categories, each subspace category having a relevance bias value;

receiving text on the hand-held text input device entered by the user, the text having one or more text characters of one or more prefixes for terms the user is using to identify a desired item;

in response to receiving a text character, performing a first incremental find to compare the one or more user-entered prefixes with the terms associated with the items and to retrieve the relevance values for the one or more user-entered prefixes matching terms associated with the items;

determining a first ranking order of items found in the first incremental find based at least in part on the retrieved relevance values and the assigned popularity values of the items found in the first incremental find;

ordering and presenting one or more items to the user found in the first incremental find based on the first ranking order;

in response to receiving at least one subsequent text character, performing a second incremental find to compare the one or more user-entered prefixes, including the at least one subsequent text character and any preceding text characters, with the terms associated with the items and to retrieve the relevance values for said one or more user-entered prefixes matching terms associated with the items;

determining a count of the number of characters of text received from the user;

adjusting the relevance value assigned to at least one of the terms associated with one or more of the items retrieved in response to the one or more user-entered prefixes, wherein the adjusting of the relevance value is based on the count of the number of text characters received from the user;

determining a second ranking order of the items found in the second incremental find based at least in part on the adjusted relevance values and the assigned popularity values of the items found in the second incremental find; and ordering and presenting one or more items to the user based on the second ranking order so that the relative order of the items found in both the first and second incremental finds is adjusted as characters are entered;

wherein at least one of determining the first ranking order and determining the second ranking order is further based on the relevance bias values of the subspace categories.

2. The method of claim 1, wherein the relevance bias values are based on the count of the number of text characters received from the user.

3. The method of claim 1, wherein the subspace categories include a personalized history category containing terms associated with items identified from previous incremental finds conducted by the user.

4. The method of claim 1, wherein the ordering and presenting of one or more items is limited to items having associated terms of one or more selected subspace categories.

5. The method of claim 4, wherein the one or more selected subspace categories are selected based on the count of the number of text characters received from the user.

6. The method of claim 1, wherein the ordered and presented one or more items are presented on a display device, the display device having display space allocated according to the subspace categories.

7. The method of claim 1, wherein the hand-held text input device includes a set of overloaded keys generating an ambiguous text input.

8. The method of claim 7, wherein the hand-held text input device is a phone, a mobile computing device, or a remote control device for a television.

9. The method of claim 1, wherein the ordered and presented one or more items are presented on a display constrained device.

10. The method of claim 9, wherein the display device is a phone, a mobile computing device, or a non-intrusive interface display area of a television.

11. The method of claim 1, wherein the assigned popularity values of one or more items of the set of items is based on a relative measure of popular opinion of the item.

12. The method of claim 1, wherein the assigned popularity values of one or more items of the set of items is based on a temporal relevance of the items or a location relevance of the items.

13. The method of claim 1, wherein at least one of determining the first ranking order and determining the second ranking order is further based on the number of prefixes of the received text.

14. The method of claim 1, wherein a portion of the set of items resides on a computer remote from the user.

15. The method of claim 1, wherein a computer remote from the user performs at least one of the steps of receiving text entered by the user, performing the first incremental find, determining the first ranking order, performing the second incremental find, determining the count of the number of characters of text received, adjusting the relevance values of the terms associated with the items, and determining the second ranking order.

16. A system for processing a search request received from a user operating a hand-held text input device, the search request directed at identifying a desired item from a set of items, each of the items having one or more associated terms, the system comprising:

a first memory for storing at least a first portion of the set of items, the items having assigned popularity values to indicate a relative measure of a likelihood that the item is desired by the user, and each item being associated with a set of terms to describe the item, each term being assigned a relevance value based on a relevance of an informational content of the term in identifying the item, the terms associated with the items being organized into searchable subspace categories, each subspace category having a relevance bias value;

a device input for receiving text entered by the user on a hand-held text input device, the text having two or more text characters of one or more prefixes for terms the user is using to identify a desired item, the two or more text characters including a first text portion and a second text portion, the second text portion being received subsequent to the first text portion;

a processor for performing a first incremental find in response to receiving the first text portion and for ordering one or more items found in the first incremental find based on a first ranking order, the first incremental find comparing the one or more user-entered prefixes with the terms associated with the items and retrieving the relevance values for the one or more user-entered prefixes matching terms associated with the items, the first ranking order of the one or more items found in the first incremental find being based on the assigned popularity values of the items and being based on the retrieved relevance values for the one or more user-entered prefixes matching terms associated with the items, so that relatively more popular and more relevant items appear earlier in the order for user selection or activation, the processor also for performing a second incremental find in response to receiving the second text portion and for ordering one or more items found in the second incremental find based on a second ranking order, the second incremental find comparing the one or more user-entered prefixes with the terms associated with the items and retrieving the relevance values for the one or more user-entered prefixes matching terms associated with the items, the second ranking order of the one or more items found in the second incremental find being based on the assigned popularity values of the items and being based on adjusted relevance values for the one or more user-entered prefixes matching terms associated with the items, the relevance values of the terms associated with the items being adjusted in response to the count of the number of text characters received from the user, the order of at least a portion of the one or more items being changed based on the adjusted relevance values of the terms, and at least one of the first ranking order and the second ranking order being further based on the relevance bias values of the subspace categories; and a device output for presenting at least one of the first and the second ordered one or more items to the user.

17. The system of claim 16, wherein the relevance bias values are based on the count of the number of text characters received from the user.

18. The system of claim 16, wherein the subspace categories include a personalized history category containing terms associated with items identified from previous incremental finds conducted by the user.

19. The system of claim 16, wherein the incremental find is limited to items having associated descriptive terms of one or more selected subspace categories.

20. The system of claim 19, wherein the one or more selected subspace categories are selected based on the count of the number of text characters received from the user.

21. The system of claim 16, further comprising a display device for presenting the at least one of the first and the second ordered one or more items, the display device having display space allocated according to the subspace categories.

22. The system of claim 16, wherein the text entered by the user on the hand-held text input device includes a set of overloaded keys generating an ambiguous text input.

23. The system of claim 22, wherein the hand-held text input device is a phone, a mobile computing device, or a remote control device for a television.

24. The system of claim 16, further comprising a display constrained device for presenting the at least one of the first and the second ordered one or more items.

25. The system of claim 24, wherein the display device is a phone, a mobile computing device, or a non-intrusive interface display area of a television.

26. The system of claim 16, wherein the assigned popularity value of one or more items of the set of items is based on a relative measure of popular opinion of the item.

27. The system of claim 16, wherein the assigned popularity value of one or more items of the set of items is based on a temporal relevance of the item or a location relevance of the item.

28. The system of claim 16, wherein at least one of the first ranking order and the second ranking order of the one or more items is further based on a count of the number of prefixes of the received text.

29. The system of claim 16, further comprising a second memory on a computer remote from the user for storing at least a second portion of the set of items.

30. The system of claim 16, wherein the processor is disposed in a computer remote from the user.

* * * * *